United States Patent
Maron et al.

(10) Patent No.: US 11,648,925 B2
(45) Date of Patent: May 16, 2023

(54) METHODS AND DEVICES FOR RELEASING AN ELECTRIC ACTUATOR IN A RELIABLE MANNER USING A QUASI-ELASTIC RELEASE END STOP

(71) Applicant: Continental Teves AG & Co. oHG, Frankfurt (DE)

(72) Inventors: Christof Maron, Usingen (DE); Heniz-Anton Schneider, Niedernhausen (DE); Christian Breiten, Ginsheim-Gustavsburg (DE); Ralf Scheib, Wald-Michelbach (DE); Lionel Pöffel, Frankfurt am Main (DE); Marco Froschauer, Oberursel/TS. (DE); Alessandro Giusto, Savona (IT); Giulio Brezza, Savona (IT); Luca Boscolo, cap Spingno Monferrato (IT); Thomas Merker, Frankfurt am Main (DE); Luigi Tessitore, Savona (IT); Thomas Winkler, Mainz (DE); Philipp Merkel, Kelkheim (DE); Niclas Görrissen, Nuremberg (DE); Pejman Bijanzadeh, Offenbach (DE); Jürgen Bauer, Wiesbaden (DE); Jürgen Balz, Hünstetten-Oherlihhar (DE)

(73) Assignee: Continental Teves AG & Co. oHG

( * ) Notice: Subject to any disclaimer, the term of this patent is extended or adjusted under 35 U.S.C. 154(b) by 237 days.

(21) Appl. No.: 15/771,718

(22) PCT Filed: Dec. 5, 2016

(86) PCT No.: PCT/EP2016/079725
§ 371 (c)(1),
(2) Date: Apr. 27, 2018

(87) PCT Pub. No.: WO2017/097695
PCT Pub. Date: Jun. 15, 2017

(65) Prior Publication Data
US 2018/0345936 A1 Dec. 6, 2018

(30) Foreign Application Priority Data

Dec. 10, 2015 (DE) ................... 10 2015 224 761.9
Jun. 3, 2016 (DE) ................... 10 2016 209 784.9

(51) Int. Cl.
*B60T 13/74* (2006.01)
*F16D 65/18* (2006.01)
(Continued)

(52) U.S. Cl.
CPC ............ *B60T 13/741* (2013.01); *F16D 51/28* (2013.01); *F16D 65/00* (2013.01); *F16D 65/18* (2013.01);
(Continued)

(58) Field of Classification Search
CPC ........ B60T 13/741; B60T 17/18; F16D 51/28; F16D 65/18; F16D 65/22;
(Continued)

(56) References Cited

U.S. PATENT DOCUMENTS 5,255,962 A * 10/1993 Neuhaus ................. B60T 8/175
303/188
6,249,737 B1 * 6/2001 Zipp ....................... B60T 7/042
303/155
(Continued)

FOREIGN PATENT DOCUMENTS

DE 812141 C 8/1951
DE 102013210528 A1 12/2014
(Continued)

OTHER PUBLICATIONS

Notice of Reasons for Refusal for Japanese Application No. 2018-529934, dated Sep. 19, 2019, with translation, 15 pages.
(Continued)

*Primary Examiner* — Christian Chace

(74) *Attorney, Agent, or Firm* — RatnerPrestia

(57) ABSTRACT

Methods and corresponding control devices for releasing an electric actuator in a reliable manner, such as an electric parking brake in particular, in a motor vehicle brake system. The aim of the invention is to provide an improved function and architecture which helps prevent the disadvantages of open-loop control systems when using a rationalized sensor system, thereby obviating closed-loop control systems. This is achieved by a release method and a corresponding electronic control unit which obtains an especially modulated change in the power requirement during the release process upon impacting the quasi-elastic release end stop of the electric actuating unit such that the change is fed back, the change being detected in order to be used as information for a power interruption or a termination of the power supply to the electric actuating unit.

10 Claims, 4 Drawing Sheets

(51) Int. Cl.

| | | |
|---|---|---|
| *F16D 55/225* | (2006.01) | |
| *F16D 65/22* | (2006.01) | |
| *F16D 51/28* | (2006.01) | |
| *F16D 65/00* | (2006.01) | |
| *F16H 25/20* | (2006.01) | |
| *F16D 121/16* | (2012.01) | |
| *F16D 51/00* | (2006.01) | |
| *F16D 51/22* | (2006.01) | |
| *F16D 51/24* | (2006.01) | |
| *F16D 121/04* | (2012.01) | |
| *F16D 121/14* | (2012.01) | |
| *F16D 121/24* | (2012.01) | |
| *F16D 123/00* | (2012.01) | |
| *F16D 125/40* | (2012.01) | |
| *F16D 125/60* | (2012.01) | |
| *F16D 121/26* | (2012.01) | |
| *F16D 127/02* | (2012.01) | |
| *F16D 129/04* | (2012.01) | |
| *F16D 129/10* | (2012.01) | |

(52) U.S. Cl.
CPC ............ *F16D 65/22* (2013.01); *F16H 25/20* (2013.01); *F16D 51/22* (2013.01); *F16D 51/24* (2013.01); *F16D 55/225* (2013.01); *F16D 2051/006* (2013.01); *F16D 2121/04* (2013.01); *F16D 2121/14* (2013.01); *F16D 2121/16* (2013.01); *F16D 2121/24* (2013.01); *F16D 2121/26* (2013.01); *F16D 2123/00* (2013.01); *F16D 2125/40* (2013.01); *F16D 2125/60* (2013.01); *F16D 2127/02* (2013.01); *F16D 2129/04* (2013.01); *F16D 2129/10* (2013.01); *F16H 2025/209* (2013.01); *F16H 2025/2084* (2013.01)

(58) Field of Classification Search
CPC .... F16D 2051/006; F16D 51/22; F16D 51/24; F16D 2121/04; F16D 2121/14; F16D 2121/24; F16D 2123/00; F16D 2125/40; F16D 2125/60; F16D 55/225; F16D 2121/26; F16D 2127/02; F16D 2129/04; F16D 2129/10; F16D 2121/16; F16H 25/20; F16H 2025/2084; F16H 2025/209; F16H 57/039; B60Y 2400/81

See application file for complete search history.

(56) References Cited

U.S. PATENT DOCUMENTS

| | | |
|---|---|---|
| 6,321,884 B1 | 11/2001 | Balz |
| 6,330,938 B1 | 12/2001 | Herve et al. |
| 8,011,482 B2 | 9/2011 | Boyle et al. |
| 8,185,287 B2 | 5/2012 | Maron et al. |
| 8,622,179 B2 | 1/2014 | Watanabe et al. |
| 9,175,737 B2 | 11/2015 | Bach et al. |
| 9,731,693 B2 | 8/2017 | Sakashita et al. |
| 2008/0133073 A1* | 6/2008 | Griffith ................ B60T 13/02 701/9 |
| 2010/0010719 A1 | 1/2010 | Bauer et al. |
| 2014/0020997 A1 | 1/2014 | Bach et al. |
| 2014/0095042 A1 | 4/2014 | Sakashita et al. |
| 2014/0156141 A1 | 6/2014 | Yabuguchi |
| 2014/0172259 A1* | 6/2014 | Blattert ................ B60T 8/172 701/70 |
| 2014/0196994 A1* | 7/2014 | Schneider ............ B60T 13/588 188/152 |
| 2014/0345989 A1 | 11/2014 | Oshio et al. |
| 2015/0134178 A1* | 5/2015 | Minoiu-Enache .... B60W 30/00 701/23 |
| 2015/0217743 A1 | 8/2015 | Blattert et al. |
| 2015/0217750 A1 | 8/2015 | Sussek |
| 2015/0274139 A1* | 10/2015 | Okada ................... B60T 8/17 701/70 |
| 2015/0316933 A1 | 11/2015 | Masuda |
| 2015/0345580 A1* | 12/2015 | Jung ................... F16D 65/22 701/70 |
| 2017/0307034 A1 | 10/2017 | Bach et al. |

FOREIGN PATENT DOCUMENTS

| | | |
|---|---|---|
| EP | 0594233 A1 | 4/1994 |
| EP | 0966376 B1 | 7/2002 |
| EP | 0920390 B1 | 11/2003 |
| EP | 1003656 B1 | 8/2006 |
| EP | 1894804 A2 | 3/2008 |
| EP | 2051889 B1 | 4/2016 |
| JP | H08142820 A | 6/1996 |
| JP | 2011063170 A | 3/2011 |
| KR | 20110125140 A | 11/2011 |
| KR | 20120003099 A | 1/2012 |
| KR | 20130123787 A | 11/2013 |
| KR | 20130123788 A | 11/2013 |
| KR | 20140042746 A | 4/2014 |
| WO | 9840255 A1 | 9/1998 |
| WO | 9845152 A1 | 10/1998 |
| WO | 9965744 A1 | 12/1999 |
| WO | 2008017613 A1 | 2/2008 |
| WO | 2012104395 A2 | 8/2012 |

OTHER PUBLICATIONS

International Search Report and Written Opinion for International Application No. PCT/EP2016/079725, dated Mar. 7, 2017, 11 pages.
Korean Office Action for Korean Application No. 10-2018-7015904, dated May 20, 2019, with translation, 16 pages.
German Search Report for German Application No. 10 2016 209 784.9, dated May 4, 2018, with partial translation, 11 pages.
Korean Notice of Allowance for Korean Application No. 10-2018-7015904, dated Nov. 26, 2019 with translation, 4 pages.
Brazilian Office Action for Brazilian Application No. BR112018008002-0, dated Aug. 3, 2020, 5 pages.
European Examination Report for European Application No. 16 805 835.2, dated Dec. 7, 2020, 8 pages.

\* cited by examiner

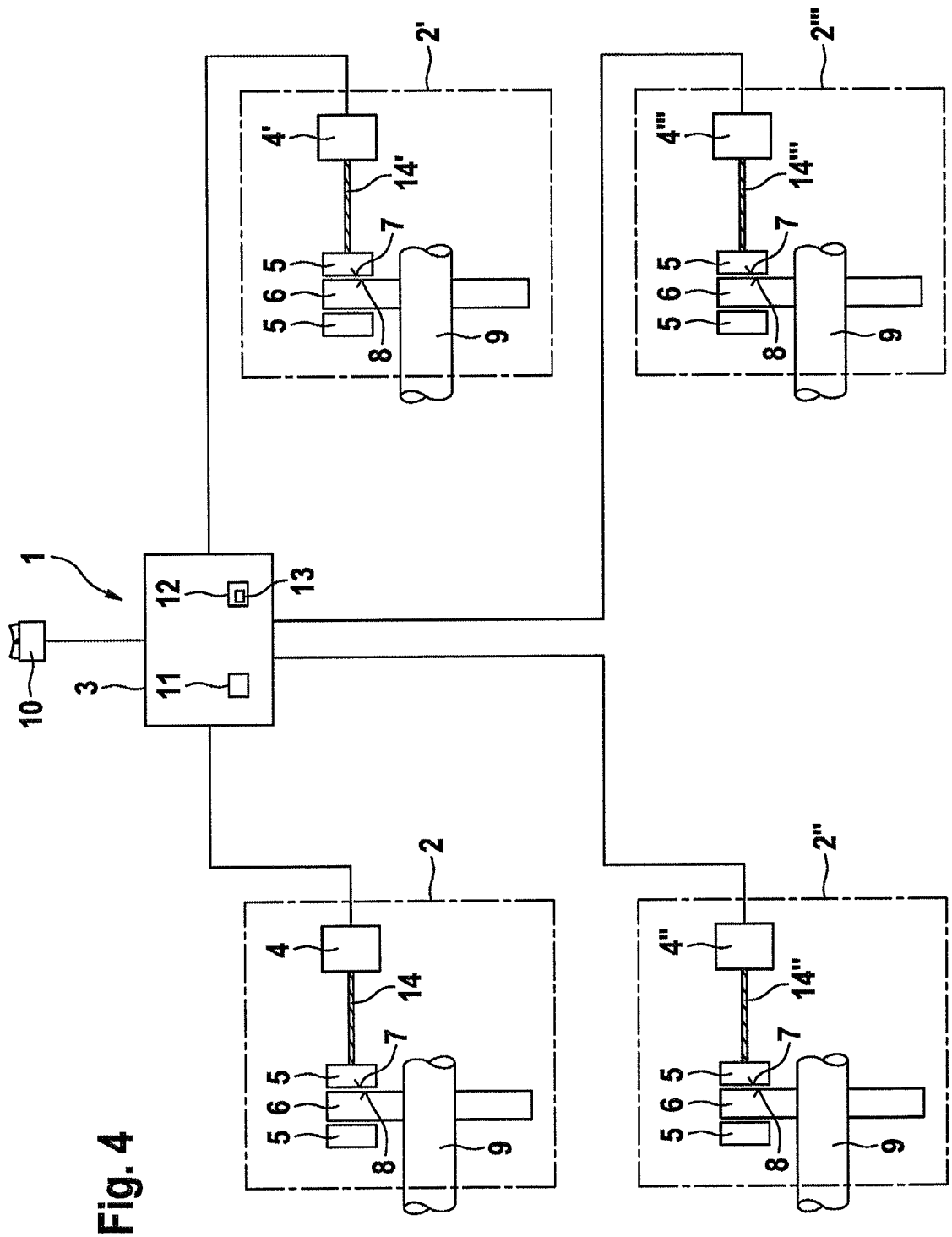

METHODS AND DEVICES FOR RELEASING AN ELECTRIC ACTUATOR IN A RELIABLE MANNER USING A QUASI-ELASTIC RELEASE END STOP

CROSS REFERENCE TO RELATED APPLICATIONS

This application is the U.S. National Stage of PCT International Application No. PCT/EP2016/079725, filed Dec. 5, 2016, which claims priority to German Patent Application No. 10 2015 224 761.9, filed Dec. 10, 2015 and German Patent Application No. 10 2016 209 784.9, filed Jun. 3, 2016, the contents of such applications being incorporated by reference herein.

FIELD OF THE INVENTION

The present inventions relate to methods and corresponding devices for releasing an electric actuator in a secured manner. In particular, the inventions relate to electronic control units for performing open-loop or closed-loop control of a Bowden-cable-activated electric parking brake system which constitutes a component of a motor vehicle brake system, in a subsidiary manner in addition to an electrohydraulic service brake system. The aim here is to apply a parking brake function electromechanically by means of an operator control element or automatically, using an electric actuator unit which is arrested in the currentless state, and wherein the parking brake can be released electromechanically by means of the operator control element or automatically, including the associated operating methods for correspondingly activating or releasing the parking brake system.

BACKGROUND OF THE INVENTION

Document EP 100 36 56 B1 (equivalent to WO 9965744), which are incorporated by reference, discloses a method for performing open-loop actuation of a central electromotive actuator unit for the two Bowden-cable-actuated wheel brakes of a motor vehicle. Accordingly, an electronic control device, including a control method, is proposed, which contains means for supplying the electric actuator unit with predetermined quantities of current. In this context, firstly an estimation is carried out as a function of movement of a control lever or control element, on the basis of which estimation a necessary quantity of current is calculated for the electric actuator unit, and is then made available to the electric actuator unit. This known system lacks feedback about the behavior of the actuator of the parking brake (actuated or released). The estimation and calculation in advance of a quantity of current by the electronic control unit follows fuzzy logic principles which are, of course, conceived in an imprecise fashion.

Document EP 966 376 B1 (equivalent to WO 9840255), which are incorporated by reference, discloses a parking brake system comprising an activation cable and a control unit for actuating an actuator of an actuator unit. This includes a double closed-loop control process, wherein two measurement variables are used as feedback about a function and state of the actuator unit as input signals of the electronic control unit. This system definitely requires two sensors for tapping the two measurement variables, specifically the force and travel, in order to sense the activation cable, which involves not only a correspondingly mechanically complex design of the actuator unit but also a correspondingly complex electronic signal processing operation on the basis of double feedback of the measurement variables in the electronic control unit. The state of the wheel brake or brakes is ignored.

SUMMARY OF THE INVENTION

There is therefore a need to equip motor vehicles with improved systems for operating as a parking brake, wherein the expenditure involved in a closed-loop method is avoided and at the same time improved actuation precision is made possible in a favorable arrangement. In addition, there is a desire to present a useful solution to the problem which permits a future-proof, that is to say open, system structure which can perform better parking brake and emergency brake functions including a secured release process with a streamlined sensor system.

In order to solve these problems, an aspect of the invention proposes that a) an actuator of an actuator unit for the secure release in the release process is moved in the direction of the release end stop while energization is performed by the electronic control unit.

b) that the electronic control unit (3) observes the power demand of the actuator unit (4) during the release process, c) that the release end stop has a defined elasticity, wherein d) the approach, formation of contact and impacting between an actuator element and the release end stop is detected through a significant change in the power demand by the electronic control unit, and that e) after the detection of the approach, formation of contact and/or abutment the electronic control unit automatically interrupts the energization of the electric actuator unit. In this context, the electronic control unit is provided mainly so as to be connected electrically as a separate component to the respective electric actuator unit(s) and such that it can be manufactured separately therefrom, that is to say in a modular fashion, and can be replaced.

In an independent arrangement, for the purpose of solving the problem the invention provides that a) for the secured release in the release process an actuator is moved by an actuator unit in a defined manner in the direction of the release end stop while energization is performed by an electronic control unit in a clocked, that is to say modulated, manner.

b) wherein a significant change in the power demand is detected by the electronic control unit, and that c) after the detection of an approach, formation of contact or abutment between the actuator and the release end stop the electronic control unit automatically terminates the energization of the actuator unit.

In a development of the two solutions, it is respectively provided that a release process or interruption or termination of energization is automatically ended by the electronic control unit if a new activation request is received in the electronic control unit.

For the purpose of secured implementation of a brake activation request (externally initiated or initiated by the driver) there is provision according to an aspect of the invention that the electronic control unit determines a minimum brake application force by means of sensor information in a first method step, and that in a second subsequent step the electronic control unit calculates a switch-off current as a function of the determined minimum brake application force using a predefined relationship, and wherein at least one or more physical parameters are included in this calculation, and wherein the parameter or parameters relate to the determined minimum brake application force, to a measured open-circuit power demand, to a measured supply voltage, to the measured ambient temperature, to a measured wheel rotation behavior, to a determined gradient and/or to a hydraulic admission pressure fed into the service brake system.

In order to facilitate a decision in the data processing of the switch-of current it is recommended that the electronic control unit basically selects or determines a specific predefined switch-off current limiting value iA for the purpose of a simplified setpoint/actual value comparison, for example from a stored table, and wherein switching off is performed by the electronic control unit if a power demand reaches or exceeds the switch-off current limiting value iA. In this case, in a further refinement of the invention there can advantageously be provision that the electronic control unit selects from a plurality of predefined switch-off current limiting values which are dimensioned differently with respect to one another. These differently dimensioned switch-off current limiting values iA are advantageously clearly graduated with respect to one another, with the result that a spread is thereby made possible. Consequently, at least the minor load situations (without a cargo, stationary state on the flat, traffic jam assistant), the usual load situations (normal cargo, normal arresting), and the extra high load situations (large cargo, severe slope, vehicle loading operation) are able to be differentiated with reduced expenditure in the feedback and nevertheless in a flexible way. In cases of doubt, in each case the switch-off current limiting value iA with greater dimensions is selected from the values offered so that the parking brake function takes place in a secured fashion (select high).

In particular, a process sequence is recommended, with the result that a) the electronic control unit energizes the electric actuator unit while continuously measuring the power demand and observes the power demand in the process, wherein b) the electronic control unit continuously or periodically compares the measured power demand i with the selected or determined switch-off current limiting value iA, and that c) the electronic control unit interrupts or terminates the energization of the electric actuator unit if the power demand thereof is higher than or equal to the switch-off current limiting value iA.

The described operating methods and an associated central electronic control unit can particularly advantageously be embodied with multiple channels. Accordingly, said central electronic control unit is electrically connected as a separate component to the electric actuator unit or units and is suitable and intended to assume simultaneously, that is to say in parallel, the individual management of this plurality of electric wheel actuator units which are provided on a wheel-specific basis. In this context, each of the electric wheel actuator units receives individual commands, that is to say electrical signals or energization, from the central electronic control unit. In other words, the electronic control, such as in particular the switching off including the respective electronic data processing operations and processes can be executed separately on a wheel-specific basis, that is to say individually for each electric wheel actuator unit, by a central electronic control unit. Therefore, this centrally initiated wheel-specific open-loop/closed-loop control is basically possible for two or more wheel brakes. It is also possible for the electronic control unit to have separate hardware, that is to say a plurality of microprocessor cores, for each of its channels, or for the electronic control unit to assign the necessary computing capacity for each channel to a single microprocessor. In principle, it may be appropriate to provide or operate the hardware and/or software, that is to say the methods and processes, redundantly, in order to increase the system availability and/or to permit safety processes to be carried out in parallel by means of mutual monitoring functions.

An aspect of the invention therefore expands the possibilities of use of central electronic control units in that a release end stop is detected by power observation while dispensing with particular force and travel measuring equipment, which streamlines the necessary sensor system and feedback and nevertheless permits each electric wheel brake actuator unit to basically have wheel-specific actuation. This broad and open system architecture opens up new fields of application, such as an improved emergency brake function, for the invention.

BRIEF DESCRIPTION OF THE DRAWINGS

Details of aspects of the invention are described below with reference to preferred exemplary embodiments and in conjunction with the appended drawing.

In the drawing, in each case schematically:

FIG. 4 shows an embodiment of a system constructed with four channels.

DETAILED DESCRIPTION OF THE PREFERRED EMBODIMENTS

In the characteristic curve profiles which are each modelled in an idealized fashion, an electromechanical brake application process is indicated using a double arrow, while an electromechanical release process in the opposite direction is symbolized by a single arrow. In this context, an actuator (activation cable, spindle) of an electric actuator unit 3 is therefore in the released state when free of force in each case in the characteristic curve sections indicated by dashed lines (red) or with crosses (green). A particular elasticity is effective in the release end stop exclusively in the characteristic curve region marked with crosses (green). The effectiveness of elasticity is a function of the actuation travel s which is carried out. The elasticity acts as an end stop which is elastically integrated into the force flux of the bearing forces, with the result that a change in the characteristic curve of the current/time profile, which can be detected without a sensor, occurs and is processed and evaluated by the electronic control unit by observation of the current profile. This is brought about in particular by virtue of the fact that an elastic element increasingly acts on the actuator at the start of the phase IV and in the phase V. Another characteristic curve range, respectively marked by circles in FIGS. 1 and 2, relates, in contrast, to the actuation range of the electric actuator unit which is loaded by tractive force. A release process is therefore basically divided into the following process phases, in each case starting from the activation state b and considered in the release direction:

Phase I: Motor startup in the release direction (start of energization)
Phase II: Depletion of force in the release direction
Phase III: Open-circuit operation in the release direction
Phase IV: Engagement on the elastic element
Phase V: End of action (end of energization)

Of course, a brake application process occurs in precisely opposite fashion.

Figure 1:
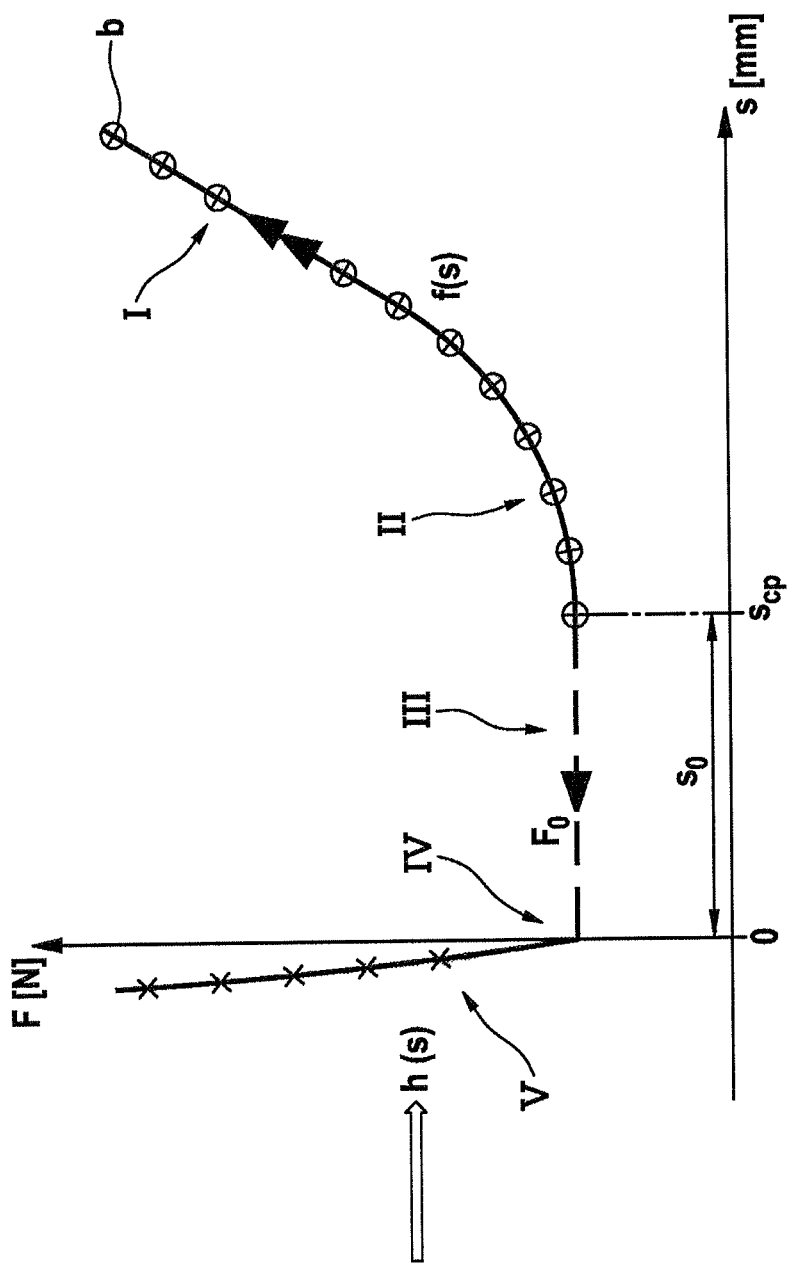
FIG. 1 shows relationships that are modelled in an idealized manner between the force (F) over an actuation travel s and an actuator (spindle), which is mounted in a rotationally fixed and axially displaceable fashion, of an electric actuator unit.
Figure 2:
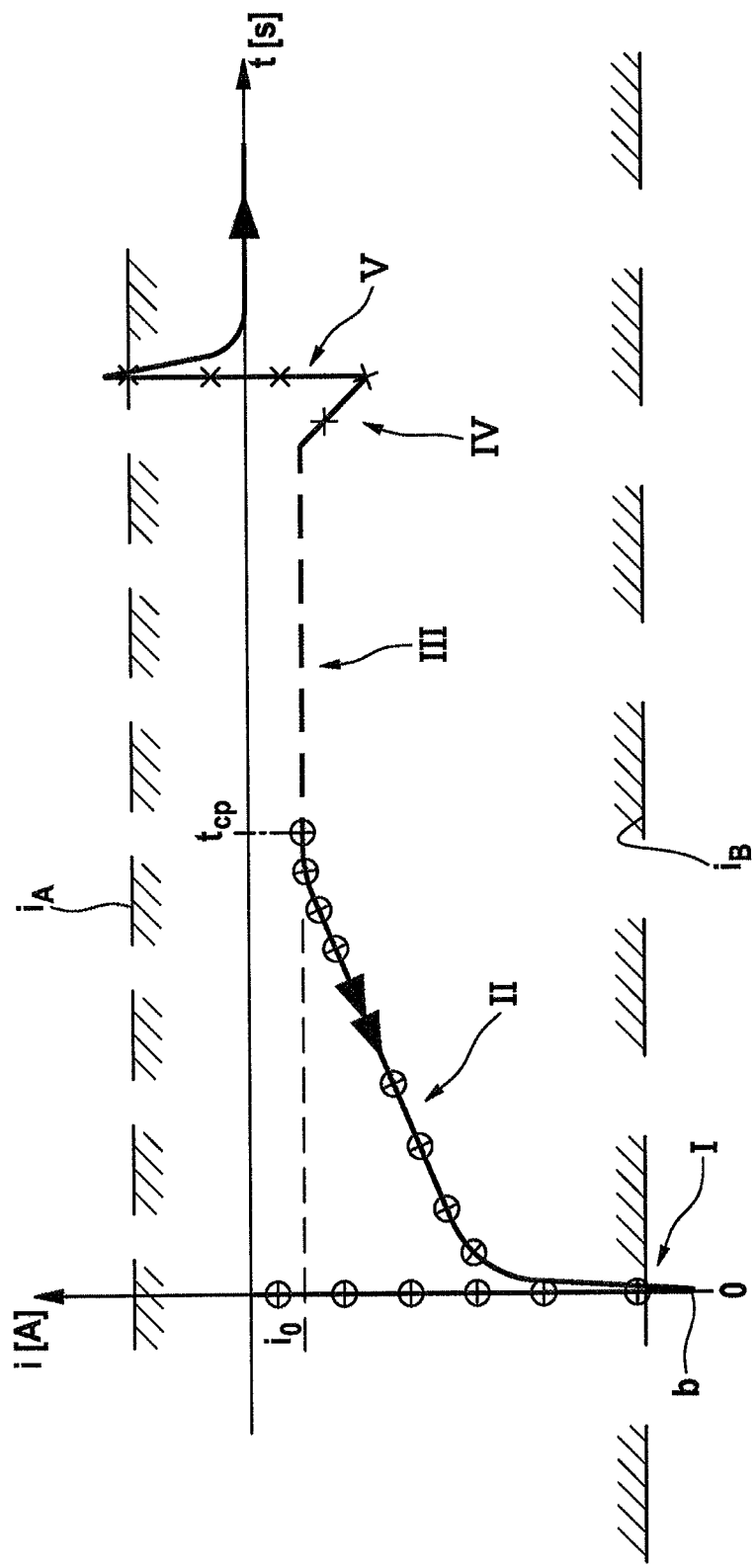
FIG. 2 shows a stage sequence I-V of the observed power demand I of the electric actuator unit over the time t, modelled in an idealized fashion, in combination with FIG. 1 in order to illustrate the method for feeding back the release end stop (release position, without application of the brake, end stop)

FIG. 1 shows a (traction) force profile F over the actuation travel s of the actuator unit. In this context, a characteristic curve branch f(s) in principle shows a force-related relationship between the actuator and the activation cable, that is to say the branch of the application of the tractive force between the actuator and the activation cable. This characteristic curve branch is marked by dashed lines (red) in the travel interval of the idle travel (free of tractive force) and by circles (blue) in the travel interval which is loaded by tractive force. Conversely, a characteristic curve branch h(s), which lies on the other side of the 0 point and is also marked with crosses (green), shows a force effect of the elastic element with respect to the actuator. This force effect occurs only in an interval between the trasversing of the 0 point and the location where the rear end stop is reached. This force effect of the elastic element is directed counter to the release movement of the actuator.

As is apparent in detail from FIG. 1, when the brake is applied with the phase III, the electric actuator unit overcomes an idle travel s0 in a manner essentially free of force (F0) in accordance with the characteristic curve part indicated by dashed lines (red). When the travel mark scp is reached, actuation force (tractive force) is built up in the phase II. The electronic control unit serves to perform closed-loop control, and, in particular, to switch the energization on and off. The electrical power profile is observed by the electronic control unit both during the application and during the release of the electric actuator unit, and is subsequently analyzed to determine to what extent a significant change has occurred in the power demand. This serves to detect whether, on one hand, the required brake application force has been reached or, on the other hand, the release state has been reached by abutment against the release end stop when a corresponding switch-off current limiting value iA occurs, before the actuator unit energization is ended.

The electronic control unit contains a microprocessor with a memory and assumes, according to an EDP-assisted and software-based cyclically executed control routine using a physical system model which is stored on a software basis, that the drum brake system is always safety transferred to the release position if the brake calipers have reached their release position which is free of brake application force. This is achieved when the brake calipers just still rest on a support device under the effect of the prestressed spring elements, that is to say free of tractive force but still in defined fashion. The electronic control unit therefore detects, in accordance with the specified model, the phase V after the phase III, that is to say the open-circuit level which is free of tractive force, is overcome, and also the phase IV has been terminated. Accordingly, it is monitored and correspondingly detected whether the power demand of the actuator unit rises in response to the end of the phase IV in a marked and reproducibly secured fashion. In other words, use is made of the particular feature that when the electric actuator unit moves into its "rear" securely released end position—that is to say the release position on the other side of the 0 point—through elastic deformation of the elastic element, a linearly or progressively rising significant change in the profile of the current/time characteristic curve is observed. This fact is automatically monitored and detected by the electronic control unit through monitoring of the characteristic curve. After it has been detected that the switch-off current limiting value iA has been reached or exceeded, the power supply of the electric actuator unit is automatically switched off by the electronic control unit without inertia effects in the drivetrain of the electric actuator unit still being able to generate any adverse effects on comfort (running on). After the switching of the energization, the drivetrain of the electric actuator unit comes to rest instantaneously, owing to self-locking, in the release position which has been reached.

Figure 3:
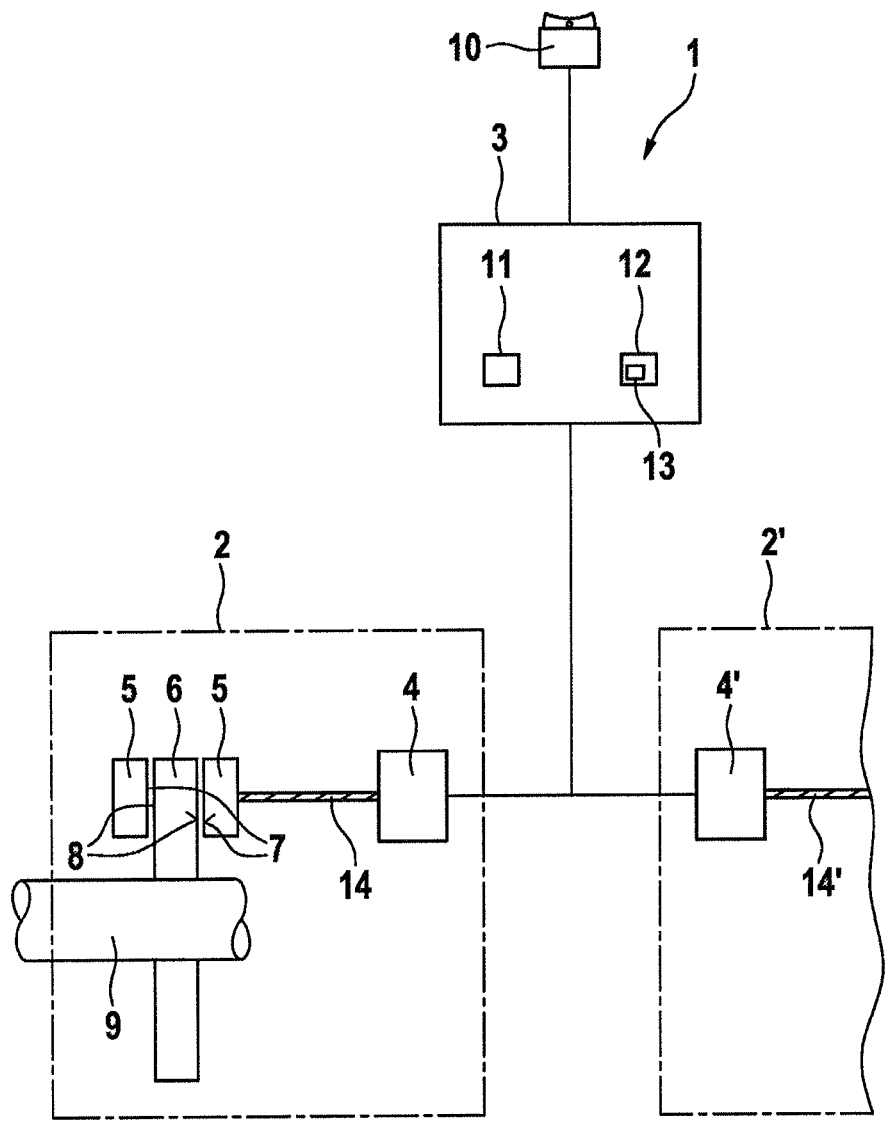
FIG. 3 shows an embodiment of a system constructed with a single channel.

FIG. 3 shows a schematic view, on the basis of a first embodiment in an exemplary manner, of a brake system 1 which is constructed with a single-channel, for two wheel brake systems 2, 2' comprising an electronic control unit 3 which has one or more microprocessors 12, 13 and is electrically connected to at least one operator control element 10, and serves to supply electricity to an electric actuator unit 4 in accordance with demand. The electronic control unit 3 includes one or more microprocessors 12, 13 which are fed with information acquired by sensor, such as, in particular, with wheel rotation information or by a sensor 11 for measuring and observing the power demand of the electric actuator unit 4. Each wheel brake system 2, 2' includes brake linings 5, mounted fixedly in terms of rotation, with friction faces 7. A rotor 6 is rotatably mounted on a axle or hub 9 of the motor vehicle (not illustrated) and has friction faces 8. Friction faces 7 of the brake linings 5 are assigned to one or more friction faces 8. The electric actuator unit 4 and the brake linings 5 are basically effectively connected mechanically by means of an activation cable 14, but can also be directly driven, in order to permit a tension-compression adjustment. On the basis of the described parallel connection of the two electric actuator units 4, 4' in the two wheel brake systems 2, 2', braking requests are implemented essentially identically in accordance with demand by generating the correspondingly requested braking effect using the two wheel brake systems 2, 2'. In this simplified configuration, the summed power demand of the two electric actuator units 4, 4' is primarily fed back to the electronic control unit 3.

Because of a basic correspondence in the components, details are given below exclusively about the systematic differences in the embodiment according to FIG. 4, wherein for the purpose of simplification the component description in FIG. 3 is referred to. Accordingly, FIG. 4 shows a four-channel design. In this context, the electric actuator unit 4, 4', 4", 4'" of each wheel brake system 2, 2', 2", 2'" is connected individually to the electronic control unit 3, and receives an individual supply for the purpose of wheel-specific open-loop or closed-loop control. The wheel-specific separation of all the open-loop and/or closed-loop control processes, including the feeding back while observing the power demand, switch-off current limiting value specification etc. takes place in this context. Refinements or simplifications which can permit speeding up of the process or a lower expenditure on computing in the electronic control unit 3 are conceivable for the separation, insofar as such adaptation is requested. For example, it is possible to divide the individual wheel brake systems 2, 2', 2", 2'" electrically into brake circuits which can be adapted in any desired way, that is to say in a systematically paired fashion, and wherein the wheel brake systems 2, 2', 2", 2'" of a brake circuit can basically be treated and processed in the same way according to the principle of "select low", or even on a wheel-specific basis. As a result, the respectively most critical wheel brake system can respectively be allocated a dominant guiding role, also in the control of the other wheel brake systems which are also connected into the same brake circuit. Accordingly, improved safety is achieved, and unstable vehicle (braking) states can be avoided. Even though FIG. 4 expressly shows a four-channel design, any other desired numbers of channels can be correspondingly formed (a 2-channel, 3-channel or x-channel design).

LIST OF REFERENCE NUMBERS

1 Brake system
2, 2', 2", 2'" Wheel brake system
3 Electronic control unit
4, 4', 4", 4'" Electric actuator unit/units
5 Brake lining
6 Rotor (brake drum or brake disk)
7 Friction face
8 Friction face
9 Axle, wheel hub
10 Operator control element
11 Sensor
12 Microprocessor
13 Microprocessor
14, 14', 14", 14'" Activation cable

The invention claimed is:

1. A method for releasing an electric parking brake of a brake system of a motor vehicle, said motor vehicle having an electronic control unit which is configured to control a plurality of electric actuator units, wherein the electronic control unit is embodied with a respective channel for each of the plurality of electric actuator units, and wherein an activation request is generated electrically by an operator control element or automatically and is executed by the plurality of electric actuator units, and wherein a release request is generated electrically by the operator control element or automatically and is executed by the plurality of electric actuator units, the method comprising:
  a) moving, by at least one of the plurality of electronic actuator units, an actuator element in the direction of a release end stop in the release process by energizing the at least one of the plurality of electronic actuator units,
  b) observing, by the electronic control unit, a power demand of the at least one of the plurality of electric actuator units,
  c) wherein the release end stop has a defined elasticity, with the result that
  d) the approach, formation of contact and impacting between the actuator element and the release end stop feeds back a particularly modulated change in the power demand of the at least one of the plurality of electric actuator units, which is observed by the electronic control unit,
  e) calculating with the electronic control unit a switch-off current using a predefined relationship and based on one or more physical parameters,
  f) selecting with the electronic control unit a defined switch-off current limiting value based on the calculated switch-off current, wherein the electronic control unit selects the switch-off current limiting value from a plurality of stored values, and
  g) automatically interrupting, by the electronic control unit, the energization of the at least one of the plurality of electric actuator units after detection of the approach, formation of contact and impacting against the release end stop, wherein the interruption of the energization is performed by the electronic control unit if an observed power demand reaches or exceeds the selected switch-off current limiting value.

2. The method for releasing an electric parking brake of a brake system of a motor vehicle as claimed in claim 1, wherein the electronic control unit automatically ends a release process or an interruption or a termination of the energization of the at least one of the plurality of electric actuator units if a new activation request is received in the electronic control unit.

3. The method for releasing an electric parking brake of a brake system of a motor vehicle as claimed in claim 1, wherein the electronic control unit determines a minimum brake application force based on sensor information in a first method step, and wherein in a second subsequent step the electronic control unit calculates the switch-off current as a function of the determined minimum brake application force using the predefined relationship, and wherein the one or more physical parameters relate to the determined minimum brake application force, to a measured open-circuit power demand, to a measured on-board power system voltage, to the measured ambient temperature, to a measured wheel rotation behavior and/or to a hydraulic admission pressure fed into the service brake system.

4. The method for releasing an electric parking brake of a brake system of a motor vehicle as claimed in claim 1, wherein
  a) the electronic control unit energizes the at least one of the plurality of electric actuator units while measuring the power demand and observes the power demand in the process,
  b) the electronic control unit continuously or periodically compares the measured power demand with a selected switch-off current limiting value, and
  c) the electronic control unit interrupts or terminates the energization of the at least one of the plurality of electric actuator units if the observed power demand is higher than or equal to the switch-off current limiting value.

5. An electronic control unit comprising hardware with at least one microprocessor configured to execute the method as claimed in claim 1.

6. A method for releasing an electric parking brake of a brake system of a motor vehicle, said motor vehicle having an electronic control unit which is configured to control a plurality of electric actuator units for adjusting respective actuator elements, wherein the electronic control unit is embodied with a respective channel for each of the plurality of electric actuator units, and wherein an activation request is generated electrically by an operator control element or automatically and is executed by the plurality of electric actuator units, and wherein a release request is generated electrically by the operator control element or automatically and is executed by the plurality of electric actuator units, the method comprising:
  a) releasing, by the electronic control unit, the actuator element of at least one of the plurality of electric actuator units with clocked energization in the release direction moves in the direction of the release end stop,
  b) observing, by the electronic control unit, a power demand of the at least one of the plurality of electric actuator units,
  c) the approaching, formation of contact or impacting between the actuator element and the release end stop feeds back a particularly modulated power demand of the at least one of the plurality of electric actuator units, d) calculating with the electronic control unit a switch-off current using a predefined relationship and based on one or more physical parameters, e) selecting with the electronic control unit a defined switch-off current limiting value based on the calculated switch-off current, wherein the electronic control unit selects the switch-off current limiting value from a plurality of stored values, and f) automatically terminating, by the electronic control unit, the energization of the at least one of the plurality of electric actuator units after detection of the approaching, formation of contact and impacting against the release end stop, wherein the termination of the energization is performed by the electronic control unit if an observed power demand reaches or exceeds the selected switch-off current limiting value.

7. The method for releasing an electric parking brake of a brake system of a motor vehicle as claimed in claim 6, wherein the electronic control unit automatically ends a release process or an interruption or a termination of the energization of the at least one of the plurality of electric actuator units if a new activation request is received in the electronic control unit.

8. The method for releasing an electric parking brake of a brake system of a motor vehicle as claimed in claim 6, wherein the electronic control unit determines a minimum brake application force based on sensor information in a first method step, and wherein in a second subsequent step the electronic control unit calculates the switch-off current as a function of the determined minimum brake application force using the predefined relationship, and wherein the one or more physical parameters relate to the determined minimum brake application force, to a measured open-circuit power demand, to a measured on-board power system voltage, to the measured ambient temperature, to a measured wheel rotation behavior and/or to a hydraulic admission pressure fed into the service brake system.

9. The method for releasing an electric parking brake of a brake system of a motor vehicle as claimed in claim 6, wherein a) the electronic control unit energizes the at least one of the plurality of electric actuator units while measuring the power demand and observes the power demand in the process, b) the electronic control unit continuously or periodically compares the measured power demand with a selected switch-off current limiting value, and c) the electronic control unit interrupts or terminates the energization of the at least one of the plurality of electric actuator units if the observed power demand is higher than or equal to the switch-off current limiting value.

10. An electronic control unit comprising hardware with at least one microprocessor configured to execute the method as claimed in claim 6.

* * * * *